United States Patent [19]

Mizukoshi et al.

[11] Patent Number: 5,321,382
[45] Date of Patent: Jun. 14, 1994

[54] THERMAL TYPE FLOW RATE SENSOR

[75] Inventors: Masahito Mizukoshi, Nagoya; Shinji Ota, Aichi; Norikazu Hosokawa, Nagoya; Yasushi Kohno, Kariya, all of Japan

[73] Assignee: Nippondenso Co., Ltd., Kariya, Japan

[21] Appl. No.: 910,844

[22] Filed: Jul. 7, 1992

[30] Foreign Application Priority Data

Jul. 8, 1991 [JP] Japan .................................. 3-167050
Jul. 17, 1991 [JP] Japan .................................. 3-176806
Nov. 12, 1991 [JP] Japan .................................. 3-323790

[51] Int. Cl.$^5$ .......................... H01C 1/08; H01C 3/04; H01C 3/12
[52] U.S. Cl. ......................................... 338/53; 338/25; 338/51; 338/293
[58] Field of Search ....................... 338/53, 25, 51, 293, 338/308

[56] References Cited

U.S. PATENT DOCUMENTS

| | | | |
|---|---|---|---|
| 4,129,848 | 12/1978 | Frank et al. | 338/308 |
| 4,146,957 | 4/1979 | Toenshoff | 338/25 X |
| 4,703,302 | 10/1987 | Hino et al. | 338/293 |
| 4,705,713 | 11/1987 | Ohta et al. | 428/209 |
| 4,906,965 | 3/1990 | Murata et al. | 338/25 |
| 5,053,740 | 10/1991 | Schultz et al. | 338/25 |

FOREIGN PATENT DOCUMENTS

| | | |
|---|---|---|
| 57-208412 | 12/1982 | Japan . |
| 60-230020 | 11/1985 | Japan . |
| 60-235020 | 11/1985 | Japan . |
| 60-236029 | 11/1985 | Japan . |
| 61-188901 | 8/1986 | Japan . |
| 2-269915 | 11/1990 | Japan . |
| 3-34649 | 7/1991 | Japan . |

Primary Examiner—Marvin M. Lateef
Attorney, Agent, or Firm—Cushman, Darby & Cushman

[57] ABSTRACT

A thermal type flow rate sensor comprising a sensor chip having a rectangular shape. The sensor chip is supported between supporting pins through ribbon-like leads connected to opposite ends of the sensor chip. The ribbon-like leads serve to correctly locate the surface of the sensor chip with respect to flow of fluid. The surfaces of the sensor chip is formed with a thin film heater. A heater portion of the thin film heater comprises a plurality of straight portions and a plurality of turn portions connecting the straight portions to each other. Each turn portion is formed in a smoothly curved shape to avoid the concentration of electric currents and is disposed at an end portion of the sensor chip which has a comparatively low temperature. This structure is effective in preventing generation of cracks in the turn portions. In addition, the plurality of straight portions are alternatively inclined to effectively utilize the surface of the sensor chip to form a long heating portion.

10 Claims, 9 Drawing Sheets

FIG. I

ΔT = TEMPERATURE OF TURN PORTION − TEMPERATURE OF AIR
Δβ = | COEFFICIENT OF THERMAL EXPANSION OF RESISTOR
      − COEFFICIENT OF THERMAL EXPANSION OF SUBSTRATE |

THERMAL TYPE FLOW RATE SENSOR

BACKGROUND OF THE INVENTION

1. Field of the Invention

The present invention relates to a thermal type flow rate sensor disposed in fluid and arranged to generate heat when electric power is supplied so as to measure the quantity of heat deprived by the fluid, so that the flow rate of the fluid is measured.

2. Related Art Statement

In general, the quantity of sucked air into the engine is an important parameter about the operation state for an electronic-control internal combustion engine in order to control the basic fuel quantity and the basic ignition timing. Hitherto, a thermal type air flow meter having a resistor which depends upon the temperature has been put into practical use as an air flow meter for detecting the quantity of sucked air.

A conventional air flow meter is arranged to have a heat-generating resistor and a temperature compensating resistor, as sensors, supported in a branch passage formed in an air suction passage for dividing and passing a portion of sucked air. Furthermore, an equilibrium bridge circuit including the heat-generating resistor and the temperature compensating resistor is constituted, and the quantity of electric power to be supplied to the bridge circuit is controlled in a feedback manner so as to make the temperature of the heat-generating resistor to be higher than the temperature of the temperature compensating resistor by a predetermined degree. Therefore, the quantity of the electric current is adjusted so as to maintain the temperature of the heat-generating resistor even if the heat corresponding to the quantity of sucked flow is deprived from the heat-generating resistor.

As the resistors serving as the heat-generating resistor and the temperature compensating resistor, a resistor made of platinum wire as it is, a coil type resistor constituted by winding the platinum wire around a cylindrical bobbin and a resistor having an insulating substrate on which a platinum film is formed have been known.

In particular, as the aforesaid type resistor having the insulating substrate on which the platinum film is formed, the resistors disclosed in Japanese Patent Laid-Open No. 61-188901, Japanese Patent Laid-Open No. 60-236029, Japanese Patent Laid-Open No. 60-235020, Japanese Patent Laid-Open No. 2-269915, Japanese Patent Laid-Open No. 57-208412 and Japanese Utility Model Publication No. 3-34649 have been known.

SUMMARY OF THE INVENTION

As described above, the conventional sensor having the insulating substrate, on which the platinum film is formed, suffers from a problem of excessively large change in the resistance value taken place with time.

The inventors of the present invention paid attention to the relationship between the temperature of the surface of the sensor chip and the shape of the platinum film and the relationship between the shape of the platinum film and the density of the electric current.

In the conventional thermal type flow rate sensor, the temperature of the surface of the sensor chip is the highest in the central portion thereof and it is lowered in directions toward the two lengthwise end portions of the sensor chip. Therefore, the temperature is considerably changed in the central portion of the sensor chip due to the intermittent power supply, causing the thermal stress acting on the platinum film to be enlarged due to the difference between the coefficient of thermal expansion of the platinum film and that of the substrate. As a result, it can be considered that the separation or cracks takes place and therefore the resistance value is changed undesirably.

Furthermore, it can be considered that the turn portion of the resistor pattern made of the platinum film at the central portion of the sensor chip causes the concentration of stress to the inside of the turn portion. As a result, the generation and the enlargement of the cracks inside the turn portion are enhanced, causing the resistance value to be changed.

In addition, the electric currents are easily concentrated to the inside of the turn portion of the resistor pattern, and heat generated due to the aforesaid concentration of the electric currents further accelerates the generation and the enlargement of the cracks. Therefore, it can be considered that the resistance value is changed.

In particular, it can be considered that, if the turn portion a right angle portion, the concentration of the stress and that of the electric currents in the edge portion cause the excessively large change in the resistance value.

In the sensor having lead wires disposed on the two end portions thereof so that the sensor is supported, the stress generated due to the change in the temperature concentrically acts on the junction between the sensor chip and the lead line, causing breakage of the junction or separation of the platinum film in the junction to take place. Therefore, it can be considered that the resistance value is changed.

An object of the present invention is to overcome the above-mentioned problems experienced with the conventional structure and another object is to provide a thermal type flow rate sensor satisfactorily freed from the change in the resistance value with time.

Another object of the present invention is to provide a thermal type flow rate sensor having a turn portion, the shape of which is improved so as to prevent the generation and the enlargement of cracks, and exhibiting reduced change in the resistance value with time.

A further object of the present invention is to provide a thermal type flow rate sensor having a turn portion, the position of which is improved so as to prevent the generation and the enlargement of crack, and exhibiting reduced change in the resistance value with time.

A still further object of the present invention is to provide a thermal type flow rate sensor having a lead, the shape of which is improved so as to reduce the stress acting on the junction between the sensor chip and the lead line which supports the sensor chip, capable of preventing the breakage of the junction and exhibiting reduced change in the resistance value with time.

According to the present invention, a thermal type flow rate sensor is provided which is arranged in such a manner that turn portions of a resistor pattern formed on an insulating substrate are composed of curves. As a result of the structure thus arranged, a thermal type flow rate sensor is provided which is capable of reducing the concentration of the stress and that of electric currents on the inside of the turn portion, preventing the generation and the enlargement of the cracks on the inside of the turn portion, and exhibiting reduced change in the resistance value with time.

According to the present invention, a thermal type flow rate sensor in which turn portions formed by curves are disposed at the lengthwise directional two end portions of an insulating substrate is provided. As a result of the structure thus arranged, a thermal type flow rate sensor is provided which is capable of disposing the turn portions at positions at which the temperature change due to the intermittence of the power supply is reduced, reducing the thermal stress generated due to the difference in the coefficient of thermal expansion of a platinum film and that of a substrate, preventing the generation and the enlargement of cracks on the inside of the turn portion and exhibiting reduced change in the resistance value with time.

The shape of the lead may be formed into a ribbon like shape and the buckling strength of the lead may be set to a value which is smaller than the junction strength between the sensor chip and the lead. As a result of the structure thus arranged, even if stress is applied to the sensor chip and the lead due to the change in the temperature, the lead is first buckled and therefore the junction between the sensor chip and the lead is protected. Therefore, a thermal type flow rate sensor exhibiting reduced change in the resistance value with time can be provided.

By employing the ribbon-like lead, the direction in which the sensor chip is installed can easily be controlled.

Furthermore, a hollow portion may be formed between the insulating substrate and the resistor. As a result, the heat conduction from the resistor to the insulating substrate can be reduced and the responsibility with respect to the change in the flow rate can be improved.

BRIEF DESCRIPTIONS OF THE DRAWINGS

Figure 10A:
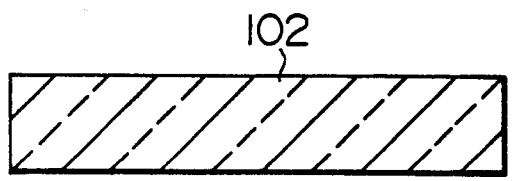
Figure 10B:
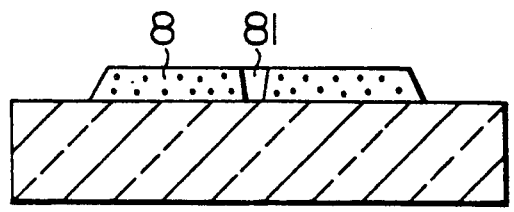
Figure 12:
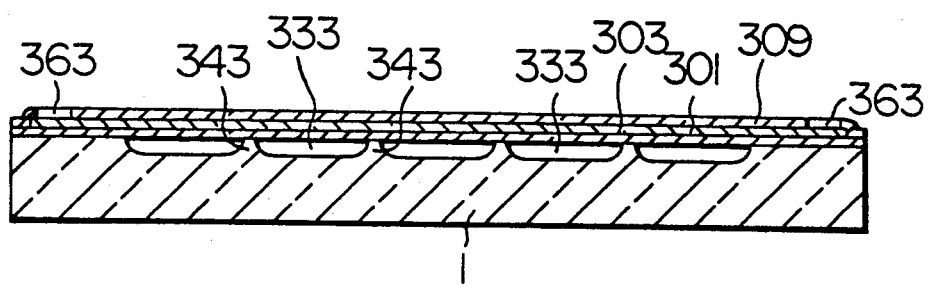
Figure 13:
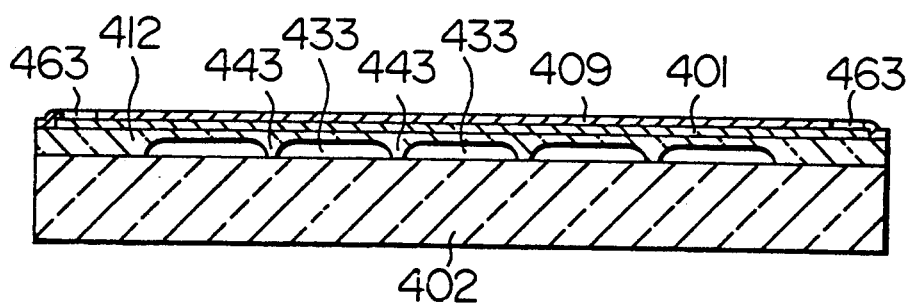
Figure 14:
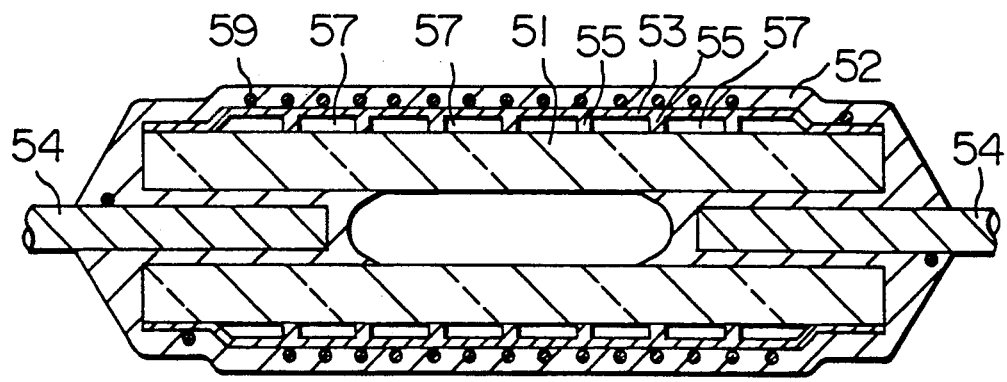

FIGS. 10(a)-10 (d) and 11 (a)-11 (d) are schematic cross sectional views which illustrate the process of manufacturing the sensor according to the fourth embodiment;

FIG. 12 is a schematic cross sectional view which illustrates the cross sectional structure of a fifth embodiment;

FIG. 13 is a schematic cross sectional view which illustrates the cross sectional structure of a sixth embodiment; and FIG. 14 is a schematic cross sectional view which illustrates the cross sectional structure of a seventh embodiment.

DESCRIPTION OF THE PREFERRED EMBODIMENTS

Preferred embodiments of a thermal type flow rate sensor according to the present invention will now be described with reference to the drawings.

Figure 1:
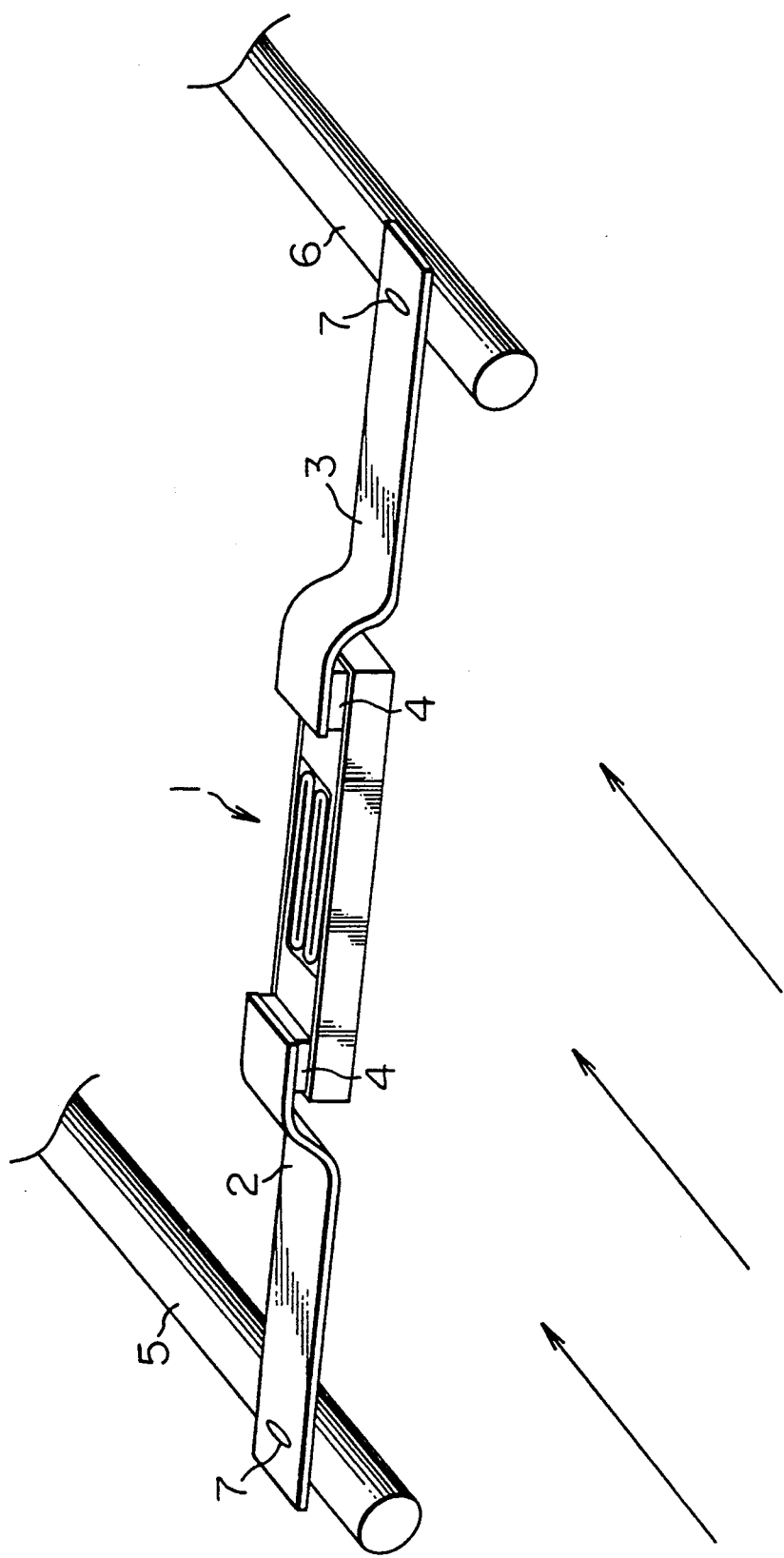
FIG. 1 is a perspective view which illustrates the structure of a first embodiment of a thermal type flow rate sensor according to the present invention.

FIG. 1 is a perspective view which schematically illustrates the thermal type flow rate sensor. This embodiment is arranged in such a manner that the present invention is applied to an air flow meter for measuring the quantity of air to be sucked into the engine of an automobile. FIG. 1 illustrates only a sensor portion of the air flow meter.

Referring to FIG. 1, a sensor chip 1 has a substrate made of glass-ceramics which is, for example, 6 mm long, 0.5 mm wide and 0.2 mm thick. The surface of the substrate is deposited with platinum by a thickness of 0.5 $\mu$m, the platinum surface being then subjected to the photolithograph so as to be formed meanderingly. Ribbon-like leads 2 and 3 mechanically support and electrically connect the sensor chip 1. Each of the aforesaid ribbon-like leads 2 and 3 is manufactured by cutting a platinum ribbon-like thin plate which is 0.5 mm wide and 0.1 mm thick into a piece which is about 2 mm long. Furthermore, the end portion to be connected to the sensor chip 1 is bent so as to be formed into a crank-like shape as shown in FIG. 1.

The end portions of the ribbon-like leads 2 and 3 are fastened to electrodes located at the end portions of the sensor chip 1 by using conductor compositions (platinum conductive compositions or conductive silver compositions) composed of, for example, noble metal powder, glass and organic compositions. The conductor compositions are fired at a predetermined high temperature level so as to evaporate the organic compositions contained in the conductor compositions and condensate the metal powder to form a fired conductor junction portion 4 bond the which serves to flow an electric current therethrough and bond the ribbon-like leads 2, 3 and the sensor chip 1 together by means of the glass. The noble metal powder establishes an electric connection between the ribbon-like leads 2, 3 and the metal thin film formed on the surface of the sensor chip 1.

Terminal pins 5 and 6 are molded in a resin sensor housing so as to be directed from the downstream side to the upstream side of the air flow. The sensor housing constitutes a portion of a suction passage of an internal combustion engine and has a branch passage for dividing the sucked air flow, the branch passage being able to have the terminal pins 5 and 6 formed therein. The terminal pins 5 and 6 are made of stainless steel. The ribbon-like leads 2 and 3 are integrally formed with the terminal pins 5 and 6 by spot welding. The size of each of the terminal pins 5 and 6 is arranged to be, for example, 0.8 mm in diameter and 10 mm long. The spot welding positions are designated by reference numeral 7 in FIG. 1.

In this embodiment, the ribbon-like leads 2 and 3 having the two flat sides are used to connect the sensor chip 1 and the terminals pins 5 and 6 to one another, so that the plane defined by the two terminal pins 5 and 6 and the surface of the sensor chip 1 can be assuredly made to run parallel to each other. Therefore, only by supporting the terminal pins 5 and 6 to run parallel to the air flow, locating can be accomplished accurately by placing the sensor chip 1 and the ribbon-like leads 2 and 3, which have been previously assembled, on the terminal pins 5 and 6.

Since each of the ribbon-like leads 2 and 3 has a flat cross sectional shape and its overall body is formed into crank-like shape, its buckling strength is relatively small as compared with a conventional cylindrical lead. Therefore, even if the interval between the two terminal pins 5 and 6 is changed due to the change in the temperature, the displacement can be adsorbed by the lengthwise directional deformations of the ribbon-like leads 2 and 3. As a result, excessive force does not act on the fired conductor junction portion 4, which is relatively weak, and therefore a problem such as the separation of the junction or a breakage of the thin metal film or the like can be prevented.

In order to determine the buckling strength (the buckling load) of each of the ribbon-like leads 2 and 3, the following equation may be employed as the standard while letting the junction strength of the junction portion 4 be 30N:

$$EI/l^2 < 30N$$

where the Young's modulus of the material of the ribbon leads 2 and 3 is E, the geometrical moment of inertia of the ribbon-like leads 2 and 3 is I, and each length is l.

That is 2 and 3 is made to be smaller than the junction strength of the fired conductor junction portion 4 so as to cause the ribbon-like leads 2 and 3 to be buckled and deformed prior to the breakage of the fired conductor junction portion 4, so that the fired conductor junction portion 4 can be protected and therefore the sensor chip 1 can be protected.

Figure 2:
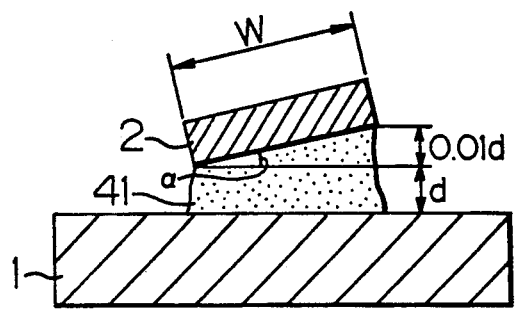
FIG. 2 is a cross sectional view which illustrates the relationship between a ribbon-like lead and a sensor chip.
Figure 3:
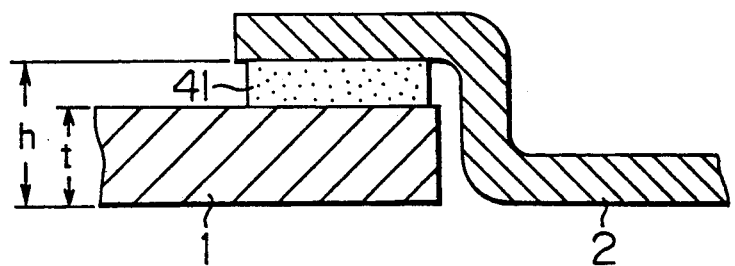
FIG. 3 is a cross sectional view which illustrates the relationship between a ribbon-like lead and a sensor chip.

Furthermore, in order to prevent excessive dispersion of the detection characteristics of the thermal type flow rate sensor, the dispersion in the angle of installation of the sensor chip 1 must be restricted within ±2% for each product. As one of the factors affecting the installation angle of the sensor chip 1, the nonuniformity of the thickness of fired conductor 41 of the junction portion 4 can be considered. As shown in FIG. 2, assuming that the dispersion of the thickness d of the fired conductor 41 of the junction portion 4 is 1% and as well as in order to meet the above-mentioned conduction of ±2%, it is preferable that the width w of each of the ribbon-like leads 2 and 3 be larger than 0.287 times the thickness d of the fired conductor 41 of the junction portion 4 (w > 0.01d/sin2°). As a result, even if the thickness of the fired conductor 41 is dispersed, the angle of dispersion of the sensor chip 1 can be assuredly made to be a desired angle.

When each of the ribbon-like leads 2 and 3 is bent to be formed into the crank-like shape, the level difference h of the crank shape of each of the ribbon-like leads 2 and 3 is made to be the total of the thickness of the sensor chip 1 and that of the fired conductor 41, so that the lower surface of the sensor chip 1 and those of the ribbon-like leads 2 and 3 are placed on one straight plane. In this case, a junction method such as the above-mentioned glass bond or the organic type adhesive agent, which is solidified from a low viscosity state, is employed.

Then, the sensor chip 1 shown in FIG. 1 will now be described in detail.

Figure 4:
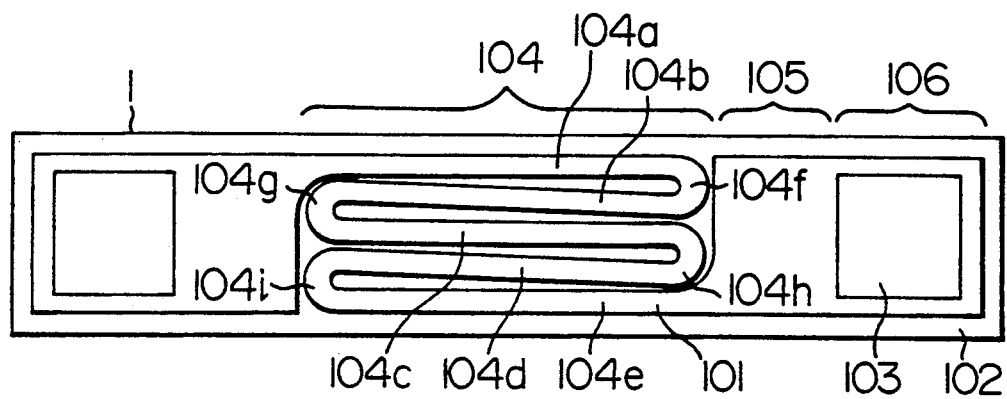
FIG. 4 is a plan view which illustrates the structure of the thermal type flow rate sensor according to the first embodiment.

FIG. 4 is a plane view of the sensor chip 1.

A substrate 102 has a thin platinum film formed by a vacuum evaporation method or a sputtering method on the surface thereof. The thin film is processed into a predetermined pattern by the photo-lithography method so that a thin film heater 101 is formed. The thin film heater 101 is composed of a heater portion 104, adiabatic portions 105, and wiring portions 106. Furthermore, a protection film ($SiO_2$ or the like) is deposited on the surface of the protection heater 101 by the sputter method or the like. Contact holes 103 are formed by partially etching the above-mentioned protection film by the photolithography method and etching so as to serve as power supply terminals. The fired conductor 41 is applied to the contact holes 103, and then the ribbon-like lead 3 is connected. The heater portion 104 is about 3 mm long and about 0.5 mm wide. The adiabatic portion 105 is a region provided for the purpose of improving the responsibility by maintaining the temperature at the central portion of the sensor chip 1 at high temperature and as well as reducing the heat transfer to the surroundings so that the surface temperature is considerably lowered at the adiabatic portion 105. The substantially rectangular heater portion 104 is composed of straight portions 104a, 104b, 104c, 104d and 104e disposed in substantially parallel to one another in the lengthwise direction thereof and circular turn portions 104f, 104g, 104h and 104i disposed on the shorter side of the heater portion 104 so as to connect the above-mentioned straight portions.

Figure 5:
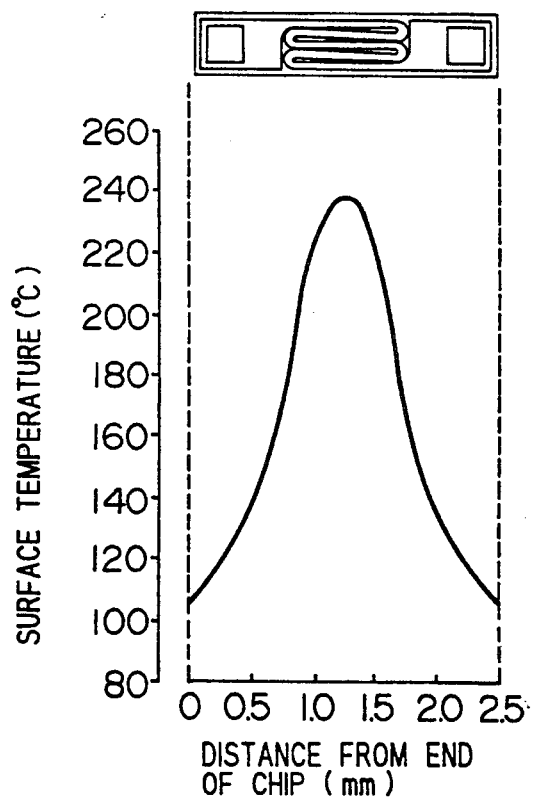
FIG. 5 is a graph which illustrates the temperature distribution realized in the thermal type flow rate sensor according to the first embodiment.

The sensor chip 1 structured as described above generates heat when it receives the electric power, resulting in the temperature distribution as shown in FIG. 5. As can be seen from FIG. 5, this embodiment is arranged in such a manner that the turn portions 104f, 104g, 104h and 104i are disposed at the end portion of the sensor chip 1 which shows low surface temperature. Therefore, the thermal stress generated in the turn portions 104f, 104g, 104i can be reduced and therefore generation of cracks in the aforesaid turn portions can be prevented.

Figure 6:
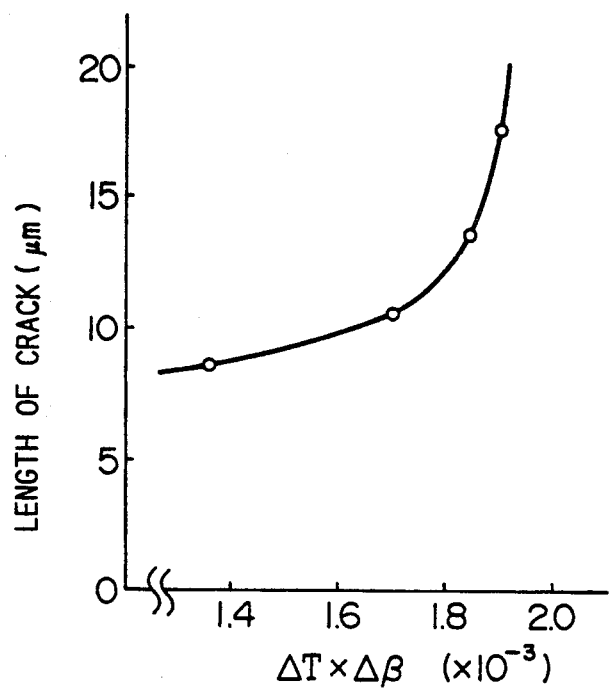
FIG. 6 is a graph which illustrates the relationship between the length of a crank and the temperature difference obtained from an experiment.

In particular, according to the result of the experiment performed by the inventors of the present invention, characteristics as shown in FIG. 6 were obtained. By locating the turn portions at the portions, whose temperatures are relatively low as made in this embodiment, $\Delta T \times \Delta B < 1.8 \times 10^{-3}$ can be met. In the aforesaid experiment, electric power was supplied to heat the central portion of the sensor chip 1 up to a temperature equivalent to the temperature of air + about 225° C. and the above-mentioned supply was repeated 50,000 times. Then, the length of the crack generated inside the turn portion was measured. The sensor chip was arranged to have the substrate made of glass-ceramics and a resistor made of platinum which is 6.2 mm long, 0.5 mm wide and 0.2 mm thick. FIG. 6 is a graph which shows the result of the experiment while making the difference between the temperature of the turn portion and that of air to be $\Delta T$ and the absolute thermal expansion of the resistor and that of the substrate to be $\Delta \beta$. In FIG. 6, there is shown the relationship between a numerical value $\Delta T \times \Delta \beta$ which denotes the temperature and the shape of the resistor pattern and the length of the crank. It can be understood from the above-mentioned graph that the degree of the enlargement of the crank is rapidly increased at a point in the vicinity of $\Delta T \times \Delta \beta = 1.8 \times 10^{-3}$. Therefore, it can be understood that the arrangement in which the turn portions are located at the low temperature region enables the generation and enlargement of the cranks to be prevented and the undesirable change in the resistance value of the sensor chip can be prevented.

Furthermore, since this embodiment is arranged in such a manner that the direction of the straight portion is aligned to the lengthwise direction of the heater portion 104, the number of the turns can be decreased as compared with the case in which the direction of the straight portion is aligned to the direction of the shorter side of the heater portion 104. As a result, the number of the turn portions, in which the resistance value is undesirably changed due to the generation of the cracks, can be decreased and therefore, the overall change in the resistance value of the sensor chip can be prevented.

In addition, since the circular turn portion does not easily generate local concentration of the electric currents as compared with a rectangular turn portion, the number of the causes of the generation of the cranks can be satisfactorily decreased.

Furthermore, by locating the straight portions and the turn portions of the heater portion 104 as shown in FIG. 4, the radius of the turn portion can be enlarged and therefore the concentration of the heat generation due to the concentration of the electric currents can be prevented. That is, since this embodiment is arranged in such a manner that the straight portions 104a, 104b, 104c, 104d and 104e of the heater portion 104 are alternately slightly inclined, circular turn portions each having a larger radius are formed in the limited area of the sensor chip.

The substrate 102 may be made of zirconia (ZrO₂), alumina (Al₂O₃) or mullite (3Al₂O₃.2SiO₃) or the like in place of glass. Furthermore, the aforesaid thin film resistor pattern may be formed on both sides of the glass substrate 102.

Figure 7:
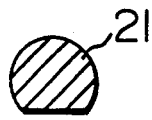
FIG. 7 is a cross sectional view which illustrates the cross section of a ribbon-like lead according to a second embodiment.
Figure 8:
FIG. 8 is a cross sectional view which illustrates the cross section of a ribbon-like lead according to a third embodiment.

Although the aforesaid embodiment is arranged such that the ribbon-like leads each having a plate-like cross sectional shape is used, the necessity for the shape of the ribbon-like lead lies in that a relatively large buckling strength can be realized and the lead has a flat portion. Therefore, a shape according to a second embodiment and formed as shown in FIG. 7 or a shape according to a third embodiment and formed as shown in FIG. 8 may be employed. The second embodiment shown in FIG. 7 has a ribbon-like lead 21 in which a straight portion is formed in a portion of the circular cross sectional shape thereof so as to be the flat portion. On the other hand, the third embodiment is arranged in such a manner that a ribbon-like lead 22 has a flattened elliptic cross sectional shape.

Then, a fourth embodiment which is a modification of the sensor chip will now be described.

In the description to be made hereinafter, the same elements as those according to the first embodiment are given the same reference numerals and their descriptions are omitted.

Figure 9:
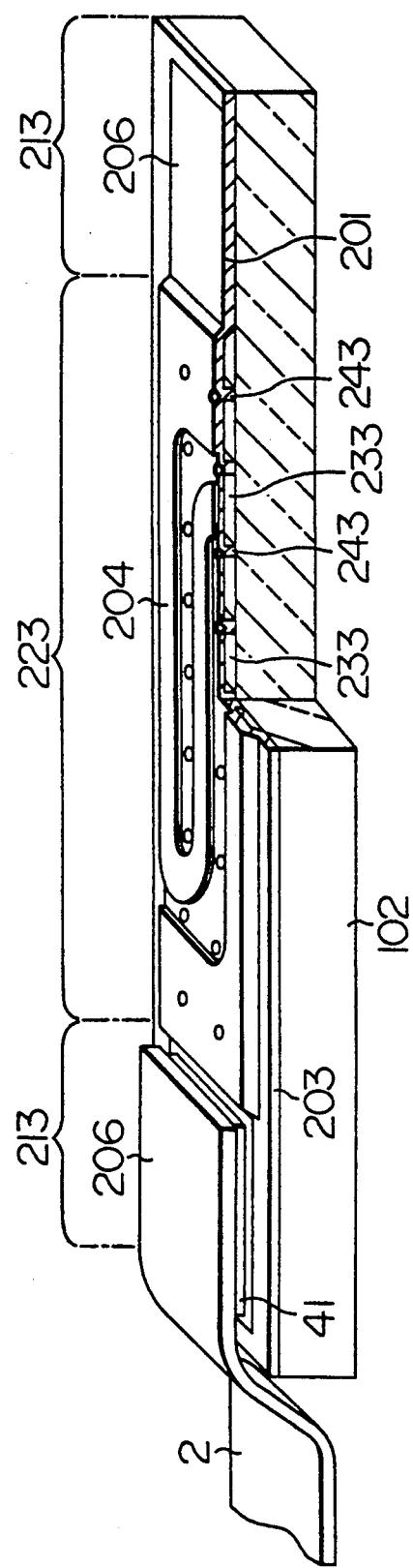
FIG. 9 is a partially broken perspective view which illustrates the structure of a fourth embodiment of a thermal type flow rate sensor according to the present invention.

FIG. 9 is a partially broken perspective view of a sensor chip according to the fourth embodiment. FIG. 9 shows one of the ribbon-like leads 2.

Referring to FIG. 9, the glass substrate 102 is formed into an elongated plate-like shape having an insulating film 203 made of SiO₂ formed on the entire upper surface thereof. The above-mentioned insulating film 203 is placed in such a way that its two end portions 213 and an intermediate portion 223 except for the peripheral portion are positioned upwards away from the top surface of the glass substrate 102 so that a hollow portion 233 is formed between the insulating film 203 and the top surface of the substrate 102. In the intermediate portion 223 in which the hollow portions 233 are formed, a multiplicity of supporting columns 243 are erected from the insulating film 203 toward the surface of the substrate 102 at the same intervals.

The insulating film 203 has a platinum film-like heater resistor 201 formed thereon and a wide and rectangular wiring portions 206 are formed on the two end portions 213 of the insulating film 203. Furthermore, a narrow heating portion 204 is formed between the wiring portions 206 to meander on the intermediate portion 223 of the insulating film 203. Although the heater resistor 201 is covered with a thin protection film in actual, it is omitted from the illustration.

Then, the process of manufacturing the thermal type flow rate sensor thus structured is shown in FIGS. 10 and 11. FIGS. 10 and 11 schematically illustrate the sensor chip and sequentially illustrate the manufacturing process.

An amorphous (a-) Si layer 8 of a thickness of about 2 μm is formed on the glass substrate shown in FIG. 10(a) by the vacuum evaporation. Then, the two end portions and the peripheral portion of the a-Si layer 8 are removed by the photolithography and plasma etching so as to be formed into a predetermined rectangular shape. Furthermore, a plurality of recesses 81 are formed at predetermined positions of the a-Si layer 8 to reach the surface of the substrate 102 (see FIG. 10(b)).

Figure 10C:
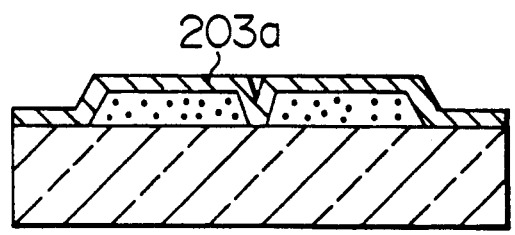
Figure 10D:
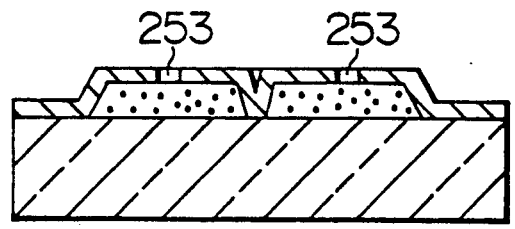

Then, the SiO₂ layer 203 is formed to be about 2 mm thick so as to serve as a lower insulating film 203a (see FIG. 10(c), and etching holes 253 are formed in the above-mentioned lower insulating film 203a by the photolithography or the like (see FIG. 10(d)). Then, the substrate 102 is dipped into a KOH aqueous solution heated to about 60° C. so as to remove the a-Si layer 8 via the etching hole 253. As a result, the hollow portions 233 are formed (see FIG. 11(a)).

Figure 11A:
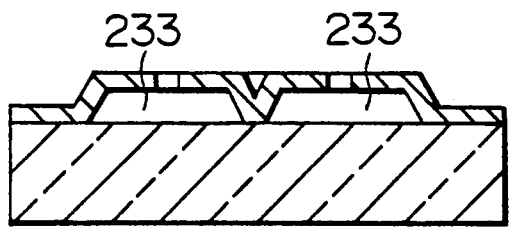
Figure 11B:
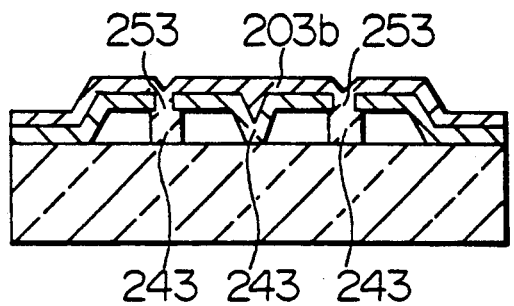

Furthermore, an SiO₂ film is formed by the sputter method in a vacuum state so as to serve as an upper insulating film 203b which forms the insulating film 203b (see FIG. 11(b)). At this time, the hollow portion 233 are exhausted to become vacuum and a portion of the upper insulating film 203b extends in the hollow portion 233 via the etching holes 253 until it reaches the surface of the substrate 102 so as to form the supporting column 243 (see FIG. 11(b)) together with the insulating films 203a and 203b formed in the recess 81 of the a-Si layer 8 (see FIG. 10(b)).

Figure 11C:
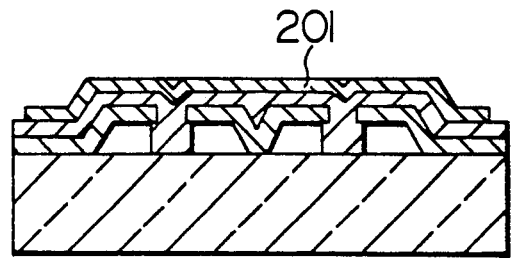
Figure 11D:
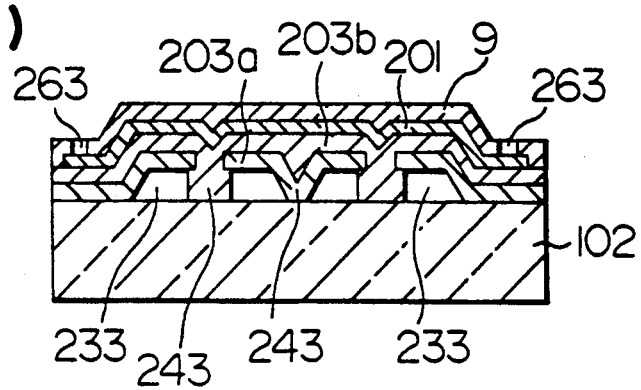

Then, a platinum film is formed to be about 1 μm thick by the vacuum evaporation and it is formed into the heater resistor 201 of a predetermined shape by the photolithography and ion milling (see FIG. 11C). Then, an SiO₂ film of about 2 μm thick is formed so as to serve as the protection film (see FIG. 11(d)). Furthermore, contact holes 263 which reach the heater resistor 201 are formed at the two end portions of the protection film 9 by the photolithography and reactive-ion etching.

When electric power is supplied to the heat resistor 201 via the contact holes 263 of the flow rate sensor thus constituted, the heat generating portion 204 of the flow rate sensor generates heat. Since the vacuum hollow portion 233 formed immediately below the heat generating portion 204 has an extremely small coefficient of thermal conductivity (substantially 0 as compared with the conventional glass having a low thermal conductivity coefficient), the heat generated by the heat generating portion 204 does not substantially transferred to the glass substrate 102 but heat is radiated into only the fluid which is flowing along the top surface of the sensor.

As a result, the resistance value of the heater resistor 201 which is changed in accordance with its temperature reflects increase/decrease in the flow rate of the fluid because the quantity of heat radiation of the heat resistor 201 is immediately changed in accordance with the flow rate of the fluid. Consequently, the flow rate sensor is able to detect the flow rate with good responsibility.

In this embodiment, the arrangement in which the inside portion of the hollow portion is made to be vacuum may be replaced by an arrangement in which a gas such as krypton, or carbon dioxide, or argon having a small coefficient of thermal conductivity is contained in the hollow portion.

Furthermore, since the supporting column portion 243 is formed in order to improve the strength of supporting the heater resistor 201, it can be omitted from the structure if a sufficient strength can be realized.

Then, a fifth embodiment will now be described. This embodiment is different from the fourth embodiment in the method of forming the hollow portion.

In the fifth embodiment, as shown in FIG. 12, the intermediate portion of the top surface of a glass substrate 302 is removed so as to be formed into recesses by etching while leaving supporting column portions 343. Then, an insulating film 303 having a predetermined thickness is connected so that sealed hollow portions 333 are formed. Furthermore, a heater resistor 301 and a protection film 309 are formed on the insulating film 303. Then, contact holes 363 are formed in the protection film 309. As a result of the structure thus arranged, an effect similar to that obtainable from the fourth embodiment can be obtained.

Then, a sixth embodiment will now be described. This embodiment is different from the fourth embodiment in the method of forming the hollow portion.

In the sixth embodiment, the central portion of the lower layer of a sub-glass substrate 412 is removed in the form of recesses while leaving supporting column portions 443 by etching as shown in FIG. 13. Then, the sub-glass substrate 412 is connected to the upper surface of a glass substrate 402, so that a sealed hollow portions 433 are formed. Then, a heat resistor 401 and a projection film 409 are formed on the sub-glass substrate 412, and then contact holes 463 are formed. Also according to this structure, a similar effect to that obtainable from the fourth embodiment can be obtained.

The application of the technology of forming the hollow portions below the heater resistor is not limited to the flat sensor chip but it may be applied to a sensor of a type manufactured by winding a platinum wire around a cylindrical bobbin. FIG. 14 is a cross sectional view which illustrates a seventh embodiment in which hollow portions are formed in a bobbin type sensor.

Referring to FIG. 14, a glass substrate 51 is formed into a cylindrical shape and an insulating film 53 is formed on the entire outer surface of the glass substrate 51. Furthermore, a multiplicity of supporting column portions 55 are formed in the insulating film 53 formed at the central portion of the outer surface of the substrate 51, so that hollow portions 57 are formed. A heater resistor 59 is constituted by winding a platinum wire around the insulating film 53 to form a coil. The heater resistor 59 thus arranged is covered with a glass protection film 52. The two end portions of the heater resistor 59 are conductively connected to a platinum lead wire 54 inserted into two openings formed in the substrate 51.

Also according to this embodiment, heat conduction to the glass substrate 51 can be reduced and the responsibility of the sensor can be improved.

What is claimed is:

1. A thermal type flow rate sensor, comprising:
   a resistor pattern having a predetermined width and a predetermined length and formed on the surface of a flat-plate-like substrate thereof,
   said resistor pattern having a plurality of straight portions and curved turn portions alternatively connecting the end portions of adjacent said straight portions to each other.

2. A thermal type flow rate sensor according to claim 1, wherein the surface of said flat-plate-like substrate is formed into a rectangular shape, said straight portions of said resistor pattern are located to substantially run parallel to the longer side of said substrate, and said curved turn portions are located on the shorter side of said substrate.

3. A thermal type flow rate sensor according to claim 2, wherein said straight portions of said resistor pattern are alternately and slightly inclined and said curved turn portions position first said ends of said adjacent portions at a first distance from each other and opposite second said ends of said adjacent portions at a second distance, greater than said first distance, from each other said straight portions are disposed at a wide interval.

4. A thermal type flow rate sensor according to claim 2, wherein said substrate has junction portions of leads formed in the shorter side two end portions thereof, said leads supporting said substrate and coupled to said resistor pattern.

5. A thermal type flow rate sensor according to claim 2, wherein said substrate comprises material having a low coefficient of thermal conductivity and the temperature is lowered in a direction from the central portion of said substrate to said shorter side of said substrate.

6. A thermal type flow rate sensor according to claim 1, wherein said straight portions of said resistor pattern are alternately and slightly inclined and said curved turn portions position first said ends of said adjacent portions at a first distance from each other and opposite second said ends of said adjacent portions at a second distance, greater than said first distance, from each other said straight portions are disposed at a wide interval.

7. A thermal type flow rate sensor according to claim 1, wherein the temperature of said turn portion, the material of said resistor, and that of said substrate, when electric power is supplied to said resistor pattern, are designed to meet a relationship expressed as follows with the difference between the temperature of said turn portion and the temperature of air being $\Delta T$ and the difference between the coefficient of thermal expansion of said resistor and that of said substrate being $\Delta \beta$:

$$\Delta T \times |\Delta \beta| < 1.8 \times 10^{-3}.$$

8. A thermal type flow rate sensor according to claim 1, further comprising ribbon-like leads supporting said substrate and connected to said resistor pattern, the buckling strength of said leads being inferior to the junction strength of the junction between said resistor pattern and said ribbon-like lead.

9. A thermal type flow rate sensor according to claim 1, further comprising a member for forming a hollow portion between said substrate and said resistor pattern.

10. A thermal type flow rate sensor according to claim 9, wherein said hollow portion is formed in a range which corresponds to a heat generating portion of said resistor pattern.

* * * * *